United States Patent [19]

Ikegami et al.

[11] Patent Number: 5,699,882
[45] Date of Patent: Dec. 23, 1997

[54] PAD CLIP FOR DISC BRAKE

[75] Inventors: Hiroshi Ikegami; Yutaka Nishikawa; Masanori Ando, all of Saitama, Japan

[73] Assignee: Akebono Brake Industry Co., Ltd., Tokyo, Japan

[21] Appl. No.: 616,652

[22] Filed: Mar. 15, 1996

[30] Foreign Application Priority Data

| Mar. 16, 1995 | [JP] | Japan | 7-084744 |
| Mar. 22, 1995 | [JP] | Japan | 7-088712 |

[51] Int. Cl.$^6$ .................................................. F16D 65/02
[52] U.S. Cl. .................... 188/73.38; 188/73.36; 188/205 A
[58] Field of Search ............... 188/73.38, 73.37, 188/73.36, 73.35, 205 A

[56] References Cited

U.S. PATENT DOCUMENTS

| 4,245,723 | 1/1981 | Moriya | 188/73.38 |
| 4,371,060 | 2/1983 | Iwata . | |
| 4,429,769 | 2/1984 | Oshima et al. . | |
| 5,472,067 | 12/1995 | Fujiwara | 188/73.38 |

FOREIGN PATENT DOCUMENTS

| 0255729 | 10/1989 | Japan | 188/73.38 |
| 6-207631 | 7/1994 | Japan . | |
| 2 172 068 | 9/1986 | United Kingdom . | |

OTHER PUBLICATIONS

Patent Abstracts of Japan, vol. 018, No. 569 (M-1695), Jul. 26, 1994.

*Primary Examiner*—Douglas C. Butler
*Attorney, Agent, or Firm*—Morgan, Lewis & Bockius LLP

[57] ABSTRACT

A pad clip for use in a disc brake in which a concave and convex fitting structure is formed in a braking support portion between each of friction pads disposed opposite to a rotor, and a support member for bearing braking force from the friction pads. The pad clip is installed between projections of the friction pads and anchor concave grooved portions of a support member in the concave and convex fitting portions to thereby support the friction pads respectively. In the pad clip, plate spring portions for urging the friction pads in the radially outward direction of the rotor are formed in one of opposite portions in the radial direction of the rotor, which are the portions following U-shaped portions in the concave and convex fitting portions. Guide projecting portions sidewise spread out are formed at side edges of the plate spring portions, and the lower edge portions of the projections are engaged with the guide projecting portions respectively so that the plate spring portions can be pushed and spread.

11 Claims, 5 Drawing Sheets

PAD CLIP FOR DISC BRAKE

BACKGROUND OF THE INVENTION

1. Field of the Invention

The present invention relates to a pad clip for use in a disc brake for braking a vehicle, and particularly relates to an improvement of a pad clip for holding a friction pad which moves in the axial direction of a rotor so as to reduce the sliding resistance of the pad against a support member.

2. Discussion of the Related Art

In a conventional disc brake, a pair of friction pads disposed so as to be able to press and hold a rotor therebetween are provided on a support member, so that the friction pads sandwiches the rotor by the action of a caliper and a hydraulic cylinder device and are made to rotate together with the rotor, the side edge portions of the pads are anchored by means of the support member so as to obtain satisfactory breaking force. In order to make the friction pads move so as to contact with the rotor surface while being held by the support member, a pad clip is installed in the anchor portion between the pads and the support member to reduce the sliding friction. This pad clip is fitted to the anchor surface of the support member facing the side edge portions of the friction pads, so that the pad clip is formed in advance to trace the shape of the anchor of the support member. The pad clip is extended to the inner circumferences of each friction pad, and the end of the extension is coupled with a spring portion engaged with an inner-circumferential corner portion on the rotor rotating-in side of the friction pads. For example, in Japanese Utility Mode Publication No. Sho. 57-149337, as shown in FIGS. 7(a) and 7(b), a U-shaped clip 3 is disposed between the opposite end portion s of the friction pad 1 and a support member 2 and the clip 3 reaches the inner circumferential surface of a friction pad 1 through the side edge surface from the outer circumferential surface to cover the pad edge portions. At the end of the extension of this clip 3 toward the inner circumferential portion of the pad 1, a T-shaped plate portion is bent so as form to a spring portion 4. The spring portion 4 is extended to the lower surface of the pad 1 to urge the pad to move radially outward in the direction of the rotor so that the inner circumferential surface of the pad 1 is separated from the support member surface opposite to the inner circumferential surface of the pad. Consequently, if a rotation moment is generated in the friction pads to generate a couple rotating and centering the holding portion of the friction pads thereby they press and hold the rotor so as to be rotated and moved together with the rotor. The generation of such a couple is suppressed by the above-mentioned urging imparted thereto in the opposite direction by the action of the spring portion. Therefore, the friction pads are adjusted lest the friction pads are inclined so that the end portions of the inner circumferential surfaces of the friction pads receive reaction force from the pad clip spring portion the rotating-out side of the rotor this defeats the smooth movement of the friction pads along their path to the anchor portion of the support member, unless partial engagement of the pads with the rotor surfaces arises.

The spring portion is formed by bending the T-shaped portion formed on the body of the pad clip. In order to obtain enough force to raise the friction pad, a cut-raised portion is provided in a support member mounting portion of the clip body which is at the base end of the spring portion so as to distend the clip body slightly from the support member to thereby reduce the spring constant of the spring portion. Specifically, as shown in FIG. 4, a U-shaped notch is formed in the body of the clip 3 extended on the inner circumferential surface of the pad 1, and a cut-raised portion 5 is formed in such a manner that it makes the clip body separate from the support member surface so as to contact with the support member surface directly. In this manner, it is possible to reduce the gap between the inner circumferential surface of the pad 1 and the facing surface portion of the pad clip. Thus, it is possible to reduce the spring constant of the spring portion 4.

However, in the conventional pad clip for a disc brake, a pad clip is formed longitudinally in the radial direction of the rotor so as to be opposite to the whole side surfaces of friction pads, and a spring portion is formed in the top end portion of the pad clip to engage with the inner circumferential surfaces of the pads to thereby urge the pads by the spring force to cancel the braking couple of the pads. Therefore, it is necessary that the pad clip be extended to the inner circumferential portion of the pads over the anchor surface between the pads and support member, and a T-shaped portion is formed and bent on the extension so as to come into contact with the inner circumferential portions of the pads to thereby form a spring portion. Accordingly, a problem arises because of the difficulty associated with the blanking property to form the spring portion. In addition, because of necessity of ensuring adequate length for the concave and convex fitting portions to the inner circumferential portions of the pads, it is necessary to use substantially more material thereby, resulting in increased manufacturing cost. Further, since a cut-raised portion is formed on the clip body in order to reduce the spring constant of the spring portion, the force exerted to the spring portion acts on the cut-raised portion so that the force is entirely received by the cut-raised portion, thereby creating a strength problem.

As another example, Japanese Utility Model Publication No. Sho. 61-14662 discloses a friction pad and a pad clip as follows. A projection is formed at the side end surface of the friction pad, and a concave grooved portion is formed in the support member which is opposite and fitted to the projection. That is, a concave and a convex fitting portion is formed in order to slide and move the friction pad for the rotor surface by the projection and the concave grooved portion. A portion of the pad clip which is disposed between opposite end side portions of each friction pad and a support member is bent into a U-shaped and extends from the outer circumferential surface of the pad to the side end surface of the pad so as to cover the end circumference of the pad, and following this, a portion is extended to reach the inner circumferential surface of the pad. Furthermore, a spring portion is provided at the end of the extension of this clip extends to the inner circumferential portion of the pad so that the spring portion is in contact with the inner circumferential surface of the pad so as to urge the pad radially outward in the direction of the rotor. This pad clip has similar effect as disclosed in Japanese Utility Model Publication No. Sho. 57-149337.

However, the aforementioned structure is such that when friction pads are installed after such a clip is fitted to the support member, the above-mentioned spring portions interfere with the pads to an extent that the pads cannot be installed if the clip is in a free shape this causes the spring portions to achieve their function of raising the friction pads. Therefore, when the pads are installed, it is usually necessary to perform such an assembly in which, generally speaking, the spring portions are formed spread to form a space where the pads are installed.

In a conventional pad clips for a disc brake, it has been necessary to assemble the pads such that the projections of the pads are fitted into the support member anchor concave grooved portion while the clip spring portions are pushed and spread when the brake pads are installed. Particularly, there has been a problem that when the spring portions are pushed and spread, sliding occurs in the projecting portions whereby the projecting portions cannot be fitted smoothly, and therefore the installation becomes difficult.

SUMMARY OF THE INVENTION

The present invention has been attained to solve the foregoing problems, and the first object thereof is to provide a pad clip for a disc-brake with an improved blanking property and also using less material. The second object of the present invention is to provide a paid clip in which there is no scattering of the load thereby improving the strength. A third object of the present invention is to provide a pad clip for a brake pad which has improved installation of the friction pad.

In order to achieve the above objects, according to the first aspect of the present invention, the pad clip for use in a disc brake having friction pads disposed opposite to a rotor, and a support member for bearing braking force from the friction pads, the pad clip being inserted between side edge portions of the pads and an anchor portion of the support member so as to support the friction pads. It is characterized by a braking support portion between the support member anchor portion and each of the friction pads being designed to have a concave and convex fitting structure which is U-shaped in the side view. The pad clip is provided with plate spring portions and cut-raised portions, each of the plate spring portions being formed on one of opposite portions of the pad clip in the radial direction of the rotor so as to follow the U-shaped portion of the concave and convex fitting portion. This urges the corresponding friction pad radially outward in the direction of the rotor, the cut-raised portions being formed by being cut and raised at the base end portions of the plate spring portions on the pad clip in the direction opposite to the spring force of the plate spring portions respectively, so as to be brought into contact with the support member. Each of the cut-raised portions is made to contact a corner of the concave and convex portions.

According to the second aspect of the invention, the plate spring portion and the cut-raised portion is formed so that the spring fulcrum of the plate spring portion and the fulcrum of the cut portion is common to each other in the pad clip according to the first aspect of the invention.

According to the third aspect of the invention, the pad clip for use in the disc brake has a concave and convex fitting structure in the braking support portion between the friction pads disposed in opposite to the rotor. A support member for supporting the braking force from the friction pads, whereby the pad clip is inserted between the anchor projecting portions of the pads and the anchor concave grooved portions of the support member constituting the concave and convex fitting structure thereby supporting the friction pads. This exhibits the characteristic that in the pad clip, the plate spring portions for urging the friction pads radially outward in the direction of the rotor are formed in one of the opposite portions in the radial direction of the rotor. These portions follow the U-shaped portions in the concave and convex fitting portions and guide projecting portions spread in the side direction are formed in the side edges of the plate spring portions, so that the plate spring portions can be pushed and spread while the edge portions of the anchor projecting portions of the pads are being engaged with the guide projecting portions.

According to the first aspect of the invention, the U-shaped pad clip portions are situated with respect to the anchor portions which are disposed opposite of the respective friction pads. The plate spring portions, for supporting a couple of the friction pads on the rotating-out side of the rotor, are formed by the clip body itself in one of the opposing upper and lower portions of the two U-shaped portions without extending the U-shaped portions to the inner circumferential side of the pads as in the conventional case.

Therefore, the projecting portion (or the concave grooved portion) of each friction pad is engaged with the corresponding U-shaped pad clip portion fitted to the concave grooved portion (or the projecting portion) of the corresponding support member anchor portion so that each friction pad is disposed on the support member by a common engagement place on each of the rotating-in and rotating-out sides of the rotor. In addition, it is not necessary to form a T-shaped spring portion on the clip body, so that the blanking property, at the time of formation of the clip, is improved, thereby reducing the cost of manufacture.

In addition, by the pad clip plate spring portion of the lower surface of the projecting portion (or the upper surface of the concave grooved portion) is elastically supported on the lower surface of the concave grooved portion (or the upper surface of the projecting portion) which forms a couple support surface, so that there is virtually no clearance between these two surfaces. Ideally, the cut raised portion bent in the opposite direction to the spring portion is formed so as to contact with a corner of the U-shaped portion of the support member, so that spring reaction force can be received by the whole surface of the cut-raised portion. Additionally, it is possible not only to reduce the spring constant but also to stabilize the spring load.

According to the second aspect of the invention, the spring portion and the cut-raised portion have a common fulcrum point, so that there is not fear that the spring force is received only by the cut portion, thereby improving the strength of the cut portion.

According to the third aspect of the invention, when the brake pads are installed onto the support members, the pads are inserted into a pad clip in such a manner that the lower portions of the projections are engaged with the guide projecting portions while the pads are inclined. The clip spring portions are then pushed down by the projections of the pads so that the projections engage with the guide projecting portions. Accordingly, it is possible to ensure insertion spaces without detaching the projection from a concave grooved portion of the support member. Thus, the upper portion of the pad is rotated so as to make the pad parallel to the rotor surface so that the upper edge portion of the projection can be inserted into the concave grooved portion of the support member, facilitating, ease of the pad installed.

DETAILED DESCRIPTION OF THE PREFERRED EMBODIMENT

A first embodiment of a disc-brake pad clip according to the present invention will be described below in detail with reference to FIGS. 1 to 5.

Figure 1:
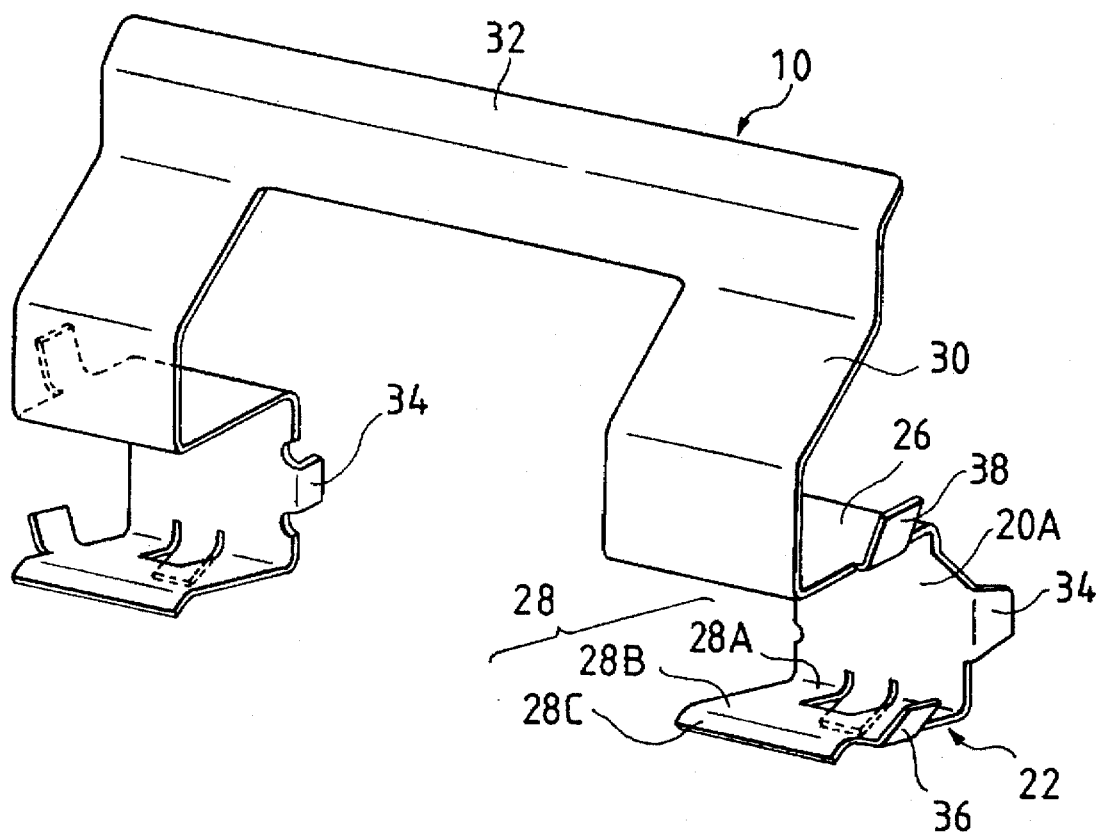
FIG. 1 is a perspective view of a pad clip according to a first embodiment.
Figure 2A:
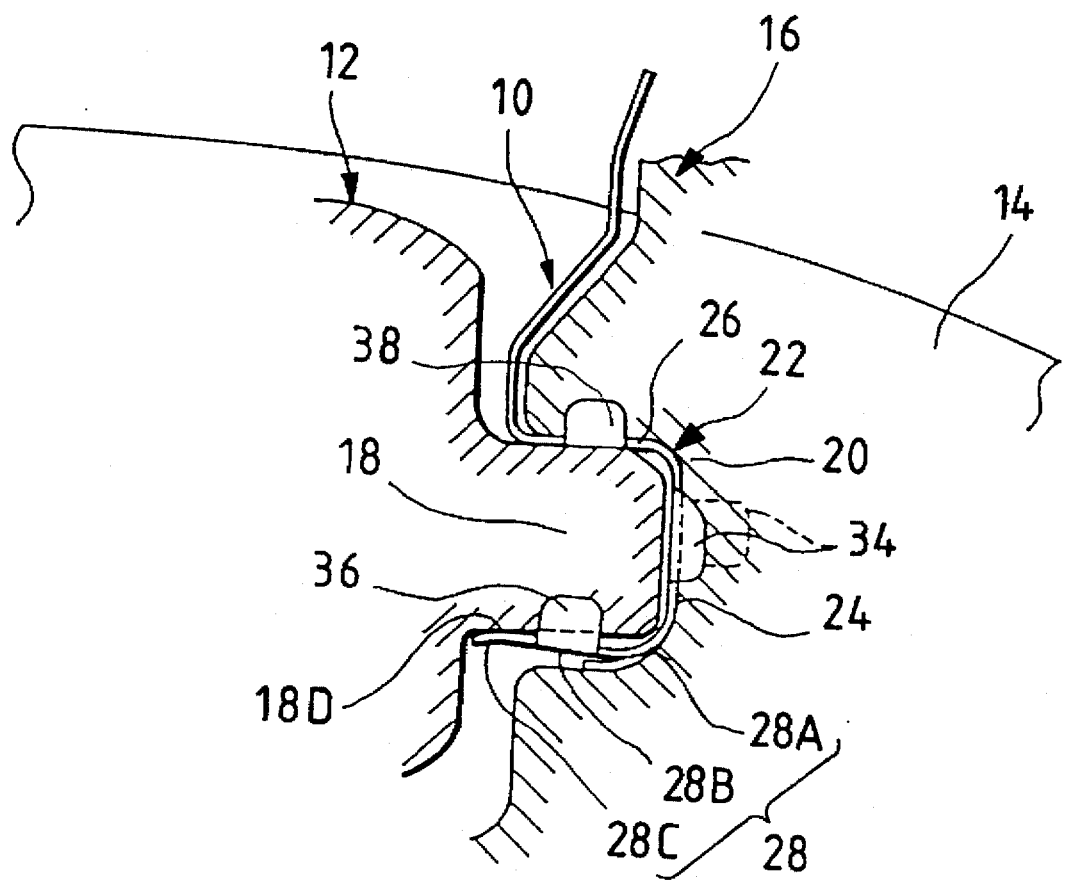
FIGS. 2(a) and 2(b) are a side explanatory sectional view and a main portion sectional view illustrating the state where the pad clip according to the first embodiment is fitted, respectively.
Figure 2B:
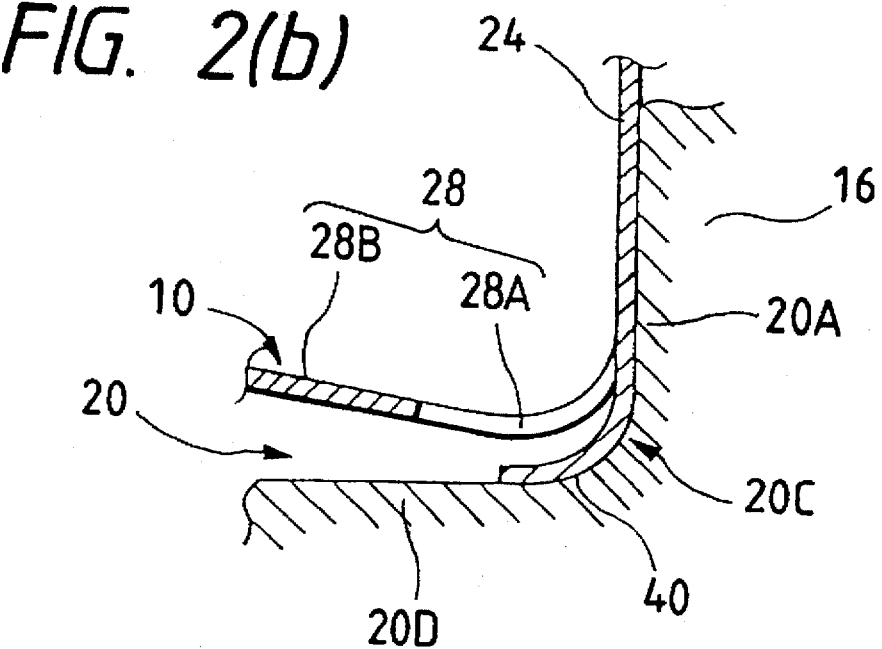
Figure 3A:
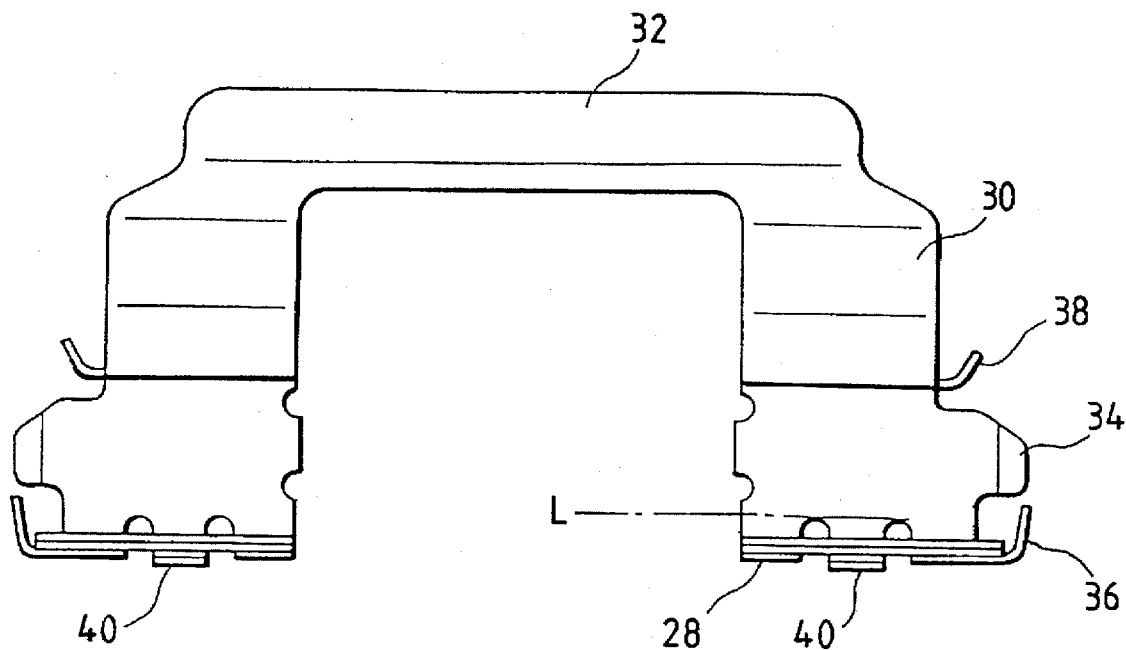
FIGS. 3(a) and 3(b) are a front view and a bottom view of the pad clip according to the first embodiment is fitted, respectively.
Figure 3B:
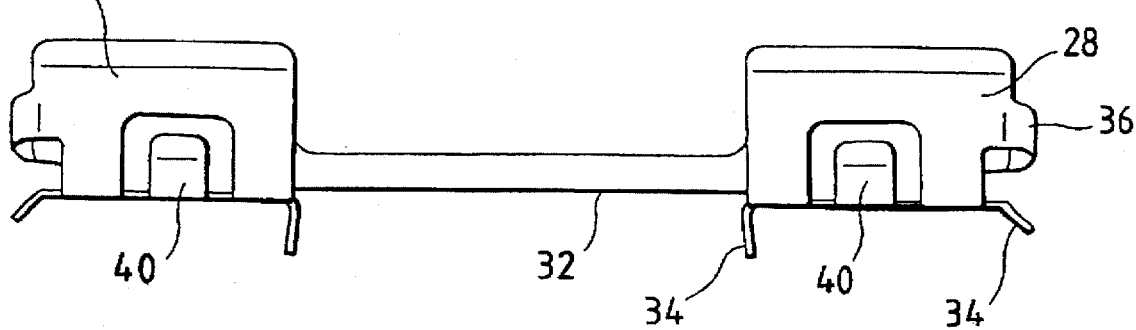

FIG. 1 is a perspective view of a pad clip according to a first embodiment. FIG. 2(a) is a sectional view illustrating the state where a pad clip 10, according to the first embodiment, is fitted to a disc brake, and FIG. 2(b) is a main portion enlarged sectional view of the clip. FIGS. 3(a) and 3(b) are a front view and a bottom view of the pad clip 10, respectively.

As shown in FIG. 2(a), a concave and convex fitting portion is formed between each of friction pads 12 and a support member 16 for holding the pads and action as a braking anchor in order to move and guide the friction pads 12 in the axial direction of a rotor 14 (in the direction perpendicular to FIG. 2(a)). In the present embodiment, a projection 18 is formed in a side edge portion of each friction pad 12, and a concave grooved portion 20 is formed in a braking anchor portion of the support member 16 which is opposite to the side edge portion of the pad so that the projection 18 and the concave grooved portion 20 are fitted into each other. A pad clip 10 according to the embodiment is disposed along the gap formed between such concave and convex fitting portions. The pad clip 10 is formed from an inverted-U-shaped plate member which is bent so as to bridge the outer circumferential portion of the rotor 14 to thereby hold the friction pads 12 on both the inner and outer sides in the same manner.

As shown in FIGS. 1 and 2(b), the pad clip 10 has a U-shaped portion 22 which is U-shaped when viewed from the side and which is fitted into the concave grooved portion 20 of the support member 16 in each of the inner and outer side portions of the rotor 14. That is, the U-shaped portion 22 includes an anchor portion 24 along an anchor surface 20A formed at the inner back portion of the concave and convex fitting portion, and upper and lower opposite portions 26 and 28 bent at the upper and lower ends of this anchor portion 24. The top end portion of the upper opposite portion 26 (on the outer circumferential side of the rotor) is further bent to form a coupling portion 30 extending outside from the gap formed at the opposite surface portions of the pad 12 and the support member 16. The coupling portion 30 inner and outer sides are coupled with each other through a bridge portion 32. The lower opposite portion 28 (rotor inner circumferential side of the rotor) is formed as plate spring portion for elastically supporting the friction pad 12. The plate spring portion 28 is bent continuously from the lower edge of the anchor portion 24 of the U-shaped portion 22. The plate spring portion 28 includes an arc portion 28A which is formed while bent so as to contact the anchor surface lower area in the concave grooved portion 20 of the support member 16 but does not contact the lower surface portion 20D of the concave grooved portion 20. An extended portion 28B is formed by extending the arc portion 28A in an obliquely upward direction. An upper contact portion 28C formed in the top end of the extended portion 28B so as to contact with a lower surface 18D of the projection 18 in the friction pad 12.

Pad clip 10 is disposed on the support member 16 in such a manner that the U-shaped portion 22 is fitted into the concave grooved portion 20 of the support member 16 so that the upper opposite portion 26 of the U-shaped portion 22 contacts with the upper surface portion 20U of the concave grooved portion 20 while the anchor portion 24 contacts with the support member anchor surface 20A, and the plate spring portion 28 is disposed so as to be opposite to the lower surface portion 20D of the concave grooved portion 20. Support fitting pawls 34 are formed in the anchor portion 24 of the U-shaped portion 22 of the clip 10 in order to prevent the pad clip 10 from coming off the support member 16.

Each of the friction pads 12 is comprised of a lining having approximately a fan-shaped external form and a back plate having almost the same form as the lining, and opposite side edge portions which are opposite to the anchor area end surface of the support member 16 in the rotation direction of the rotor 14, respectively. As mentioned above, the projecting portion 18 to be engaged with the concave grooved portion 20 of the support member 16 is formed in each of the opposite side edge portions of the friction pads 12. The projecting portion 18 on the opposite sides in the circumferential direction of the rotor are engaged with the U-shaped portions 22 of the pad clip 10, respectively, so that the friction pads 12 are disposed on the both inner and outer sides of the rotor 14, respectively.

The pad clip 10, as mentioned above, includes a plate spring portion 28 including the arc portion 28A bent and formed without contacting the lower surface portion 20D of the concave grooved portion 20 in the support member 16. The extended portion 28B is formed by extending the arc portion 28A obliquely in an upper direction, and the upper contact portion 28C is formed in the top end of the extended portion 28B and contacts the lower surface 18D of the projection 18 of the friction pad 12.

In addition, a cut-raised portion 40 is formed by the portion extending from the arc portion 28A, which is a base end portion of the plate spring portion 28, to the extended portion 28B. This portion 40 is cut and raised in the direction opposite to the direction where the urging force is given to the pad by the plate spring portion 28 so that the cut-raised portion 40 is made to contact with a corner portion 20C between the support member concave grooved lower surface portion 20D and the anchor portion 20A so as to stabilize the load given to the clip 10.

The corner portion 20C is formed into an arc to prevent concentration of stress, and the cut portion 40 is contoured such that it makes contact along the entire surface area of the arc corner position 20c. This is accomplished by the cut portion 40 being cut and raised by cutting a U-shaped notch such that the notch begins at a start point which is coincident with the start point of the arc of the anchor surface 20A, turns back along a path from the arc portion 28A of the plate spring portion 28 to the extended portion 28B, and then reaches the start point of the arc. The cut portion 40 is cut and raised to the back side of the plate spring portion 28 and bent so as to trace the arc of the arc corner portion 20C, as shown in FIG. 2(b).

The arc portion 28A of the plate spring position 28 is constructed to not contact with the lower surface portion 20D of the concave grooved portion 20 as shown in the same drawing. The start point of the arc of the arc portion 28A is made to coincide with the notch start point of the cut portion 40 (the center line L in FIG. 3(a)) so as to make the spring fulcrum of the plate spring portion 28 and the fulcrum of the cut-raised portion 40 common to each other.

The operation of the pad clip 10 as designed will be described below. Braking during the advance of a vehicle is performed by pressing a pair of friction pads 12 against the rotor 14 by means of an oil-pressure cylinder mechanism provided in a caliper (not shown). The two friction pads 12 rotate and move together with the rotor 14 while the pads are pressing and holding the rotor 14 therebetween. Then, a rotational moment is generated in the friction pads 12 so that a couple is generated to rotating and thus centering their press-holding portion. The couple rotates the friction pads 12 so that the lower surface 18D of the projection portion 18 of each pad is pressed against the upper surface of the plate spring portion 28 of the U-shaped portion 22 of the pad clip 10 at the rotating-out side of the rotor 14.

The pushing-in force is elastically supported by the plate spring portions 28 provided in the lower opposite portions of the U-shaped portions 22, so that there is virtually no clearance between the two surfaces. Therefore, instability behaviors, such as vibrations or the like, of the friction pads 12 are suppressed upon braking of the vehicle, and the rotations of the friction pads 12 are suppressed. Although the plate spring portions 28 of the pad clip 10 support the couple from the friction pads 12, each of the cut-raised portions 40 is provided in the arc portion 28A which is the root of the plate spring portion 28, and the root of the cut portion 40 is made coincident with the root of the plate spring portion 28 so as to make the roots a common spring support point.

Therefore, the entire surface of the cut portion 40 is in contact with the concave grooved corner portion 20C so that the entire cut portion 40 receives the elastic reaction force of the plate spring portion 28. The elastic urging force of the plate spring portion 28, thus becomes a stable elastic load. As a result, the support membering force of the pads is stabilized to such an extent that the spring constant of the plate spring portions 28 can be reduced. In addition, because of a common structure whereby the plate spring portions 28 of the pad clip 10 and the cut-raised portions 40 are formed in the same portion, blanking in manufacturing of the pad clip 10 is improved thereby reducing manufacturing cost.

At this time, the pad clip 10 is installed onto the support member 16 in advance so that the pads 12 are fitted to the pad clip 10 attached to the support member 16. The pad clip 10 is designed in such a manner as follows in order to make the pad installation easier.

Guide projecting portions 36 which spread outward are formed at the outside edges of the plate spring portions 28, and the edge portions of the projections 18 are engaged with the lower guide projecting portions 36, respectively, so that the plate spring portions 28 can be pushed and spread, that is, the plate spring portions 28 can be pushed down to form spaces to which the projections 18 can be inserted. That is, the right edge portions of the plate spring portions 28 in FIG. 1 correspond to the back plates of the friction pads 12, respectively, where the lower guide projecting portions 36 are bent so as to be opposite to the backs of the projections 18 so that the pads cannot come off. Ideally, the lower guide projecting portions 36 are formed so as to incline so that the upper edge portions are spread outward and the outside inclination angle β relative to the horizontal plane is established to be β<90° as shown in FIG. 4.

At one of the side edges of an upper opposite portion 26 in each of the U-shaped portions 22, at the edge on the same side as the lower guide projecting portion 36, an upper guide projecting portion 38 is bent and formed upward. This upper guide projecting portion 38 is to hold the support member 16 when it is attached and then the upper guide projecting portion 38 is not made parallel to the plane of the support member 16 but is inclined and bent. The bending direction is in the same direction as the lower guide projecting portion 36, and the angle α relative to the horizontal plane following the upper opposite portion 26 is formed so as to be α<90°. The relationship between this angle α and the above-mentioned angle β is set so that the relation α<β is established.

Figure 4:
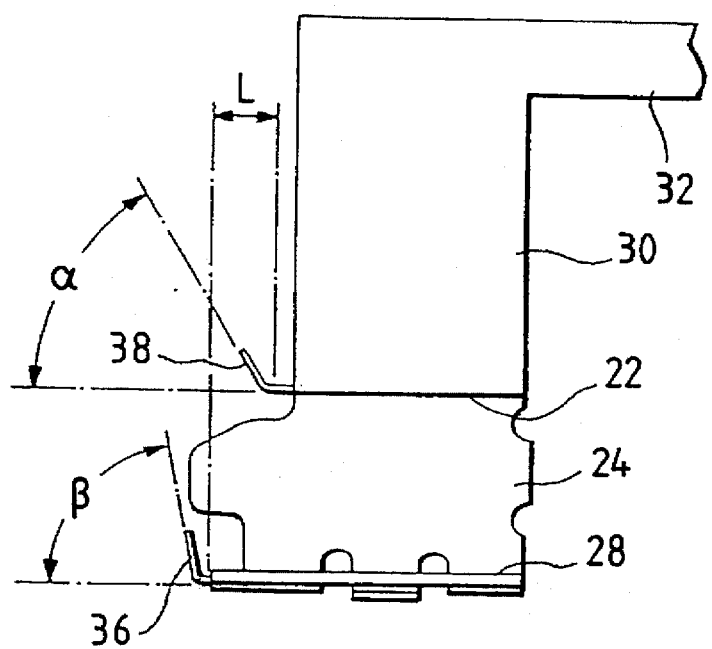
FIG. 4 is a side view of the pad clip of a first embodiment.

Furthermore, as shown in FIG. 4, the bent portion of the lower guide projecting portion 36 projects outward more than the bent portion of the upper guide projecting portion 38, and the distance L between these two portions is smaller than the thickness of the back plate of the friction pad 12. Consequently, when the projection 18 is inserted from above while being guided by the upper and lower guide projecting portions 38 and 36, the projection 18 is inserted obliquely while being restricted to the extent of the inclination angles α and β of the respective upper and lower guide projecting portion.

The installation operation of the friction pads by use of such a disc-brake pad clip having the stated configuration will be described below.

Figure 5A:
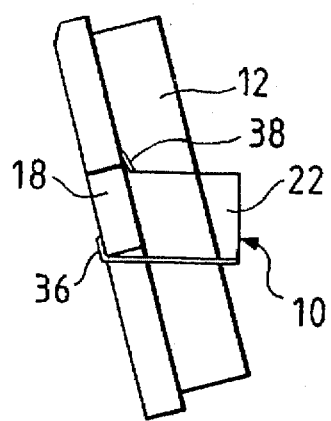
FIGS. 5(a), 5(b) and 5(c) are explanatory diagrams of the operation of installation of a friction pad according to the first embodiment, respectively.

As shown in FIG. 5(a), each pad 12 is inserted in a manner so that the outside edge portion of the lower end of the projection 18 is made to agree with the bent corner portion of the lower guide projecting portion 36 while the upper portion of the friction pad 12 is inclined to the left, i.e., the friction pad 12 inclination corresponds to the inclination of the lower guide projecting portion 36. As a result, the projection 18 contacts the plate spring portion 28 of the pad clip 10 and is inserted so that the inside edge portion of the upper end portion of the pad projection 18 is located outside the upper guide projecting portion 38.

Subsequently, the friction pad 12 is rotated with the outside edge portion of the lower end of the projection 18 being utilized as a fulcrum point clockwise in FIG. 5(a), whereby the projection 18 pushes down the spring portion 28 to such an extent that it comes into contact with the upper and lower guide projecting portions 38 and 36.

Figure 5B:
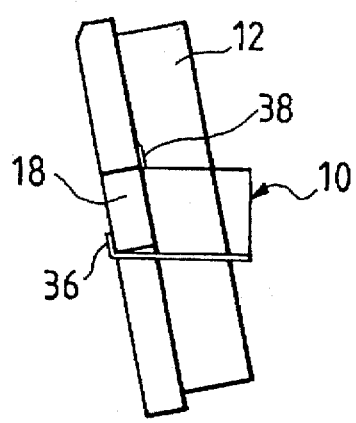
Figure 5C:
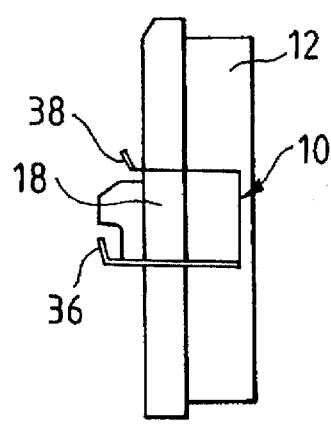

As a result of rotation, the projection 18 enters a portion under the upper guide projecting portion 38, as shown in FIG. 5(b). Finally, the projection 18 is slidably held on the pad clip 10 in such a state that the friction pad 12 is kept vertical as shown in FIG. 5(c).

In this embodiment, each friction pad 12 can be installed easily so that the pad clip 10 is installed on the support member 16 in advance, and the friction pad 12 is fitted onto the pad clip 10 so that the lower portion of the projection 18 of the friction pad 12 is obliquely inserted by use of the gap (L) between the upper guide projecting portion 38 and the lower guide projecting portion 36. The U-shaped portion 22 of the clip 10, and the plate spring portion 28 are pushed down to thereby rotate the upper portion of the projection 18.

The lower guide projecting portion 36 locks the projection 18 while the pad 12 is rotated, so that the dislodging of projection 18 from the concave grooved portion 20 is prevented. Therefore, it is possible to install the friction pad 12 on the support member 16 through a series of successive operations including inserting onto the clip 10 and upper portion rotating. Accordingly, installation of the friction pads 12 is made extremely easy by performing operations on the pads without using any supplementary jigs.

Figure 6:
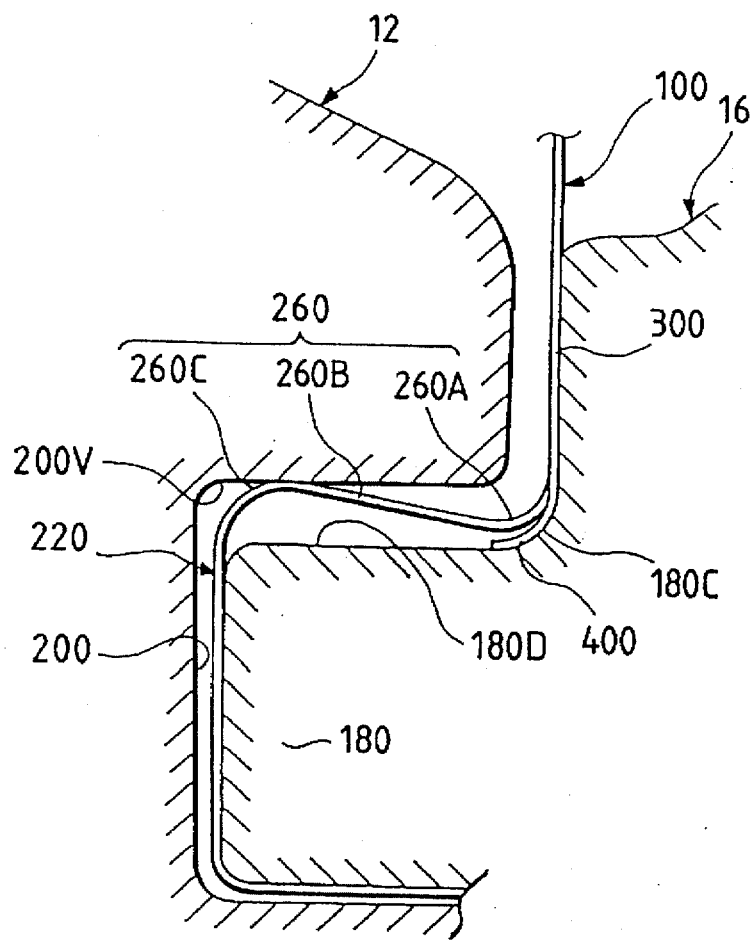
FIG. 6 is an explanatory sectional view of a second embodiment.
Figure 7A:
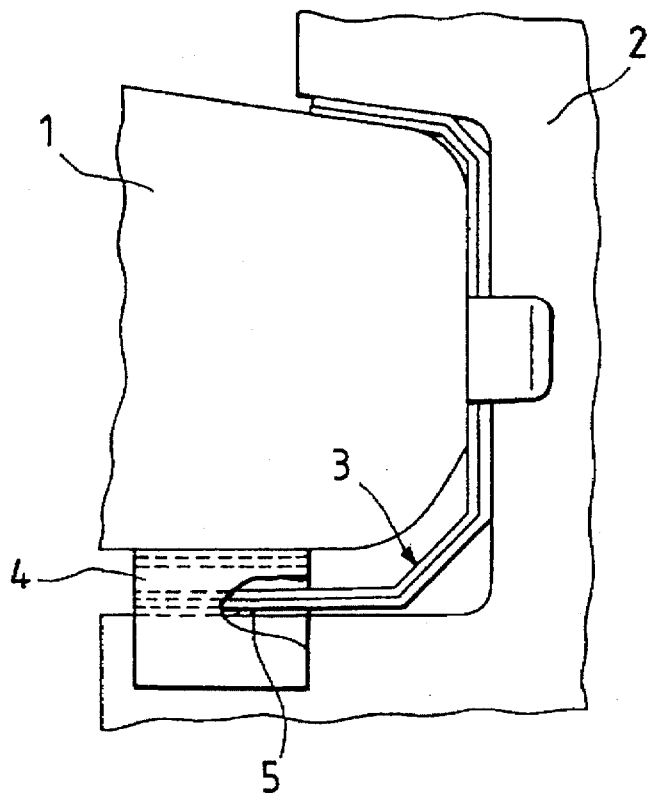
FIGS. 7(a) and 7(b) are explanatory diagrams of a conventional pad clip, respectively.
Figure 7B:
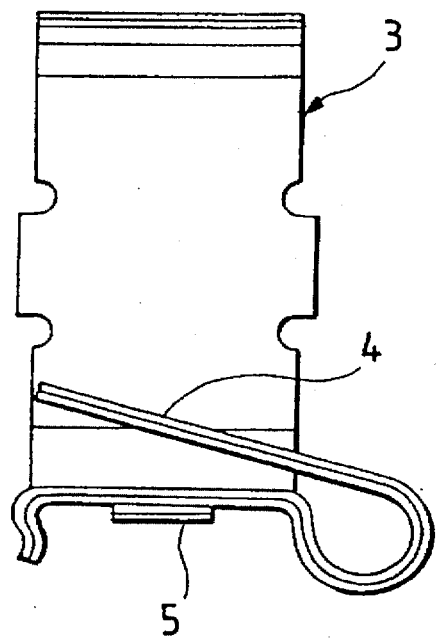

FIG. 6 shows a fitting structure of the pad clip 100 according to the second embodiment of the present invention. The second embodiment is different from the first embodiment in that the second embodiment is applied to a disc brake having a concave and convex fitting structure for each of the friction pads 12 in which a concave grooved portion 200 is formed in the side and surface of the friction pad 12, and a projection 180 is formed in the support member 16. A pad clip 100 has a U-shaped portion 220 to be fitted into a concave and convex fitting portion. A plate spring portion 260 is formed in the clip 100 is formed in an upper opposite portion of the U-shaped portion 220.

That is, an arc portion 260A is formed at a corner portion where a coupling portion 300 extending upward from the plate spring portion contacts the U-shaped portion 220. This arc portion 260A is bent so as not to contact the upper surface portion 180D of the projecting portion 180 of the support member 16. An extended portion 260B is formed by obliquely upward extending the arc position 260A, an upper contact portion 260C is formed by further bending the top end of this extended portion 260B so as to contact with an upper surface 200U of the concave grooved portion 200 of the friction pad 12.

Also, a cut-raised potion 400 is provided along the portion from the arc portion 260A, which a base end portion of the plate spring portion 260, to the extended portion 260B. The cut portion 400 is cut and raised in the direction opposite to the direction of pad urging by the plate spring portion 260 so as to contact with the corner portion 180C between the upper surface portion 180D of the support member projection 180 and the support member end surface 300, thereby stabilizing the load given the clip 100.

Similar to the first embodiment, the corner portion 180C is formed so as to be arcuate to prevent concentration of stress and the cut portion 400 is contoured to this arc corner portion 180C so that the entire surface of the cut portion 400 contacts the corner portion 180C. The arc portion 260A of the plate spring portion 260 is made so as not to contact the upper surface portion 180D of the projection 180. The start point of the arc of the arc portion 260A is made to coincide with the notch start point of the cut portion 400 so as to make the spring fulcrum of the plate spring portion 260 and the fulcrum of the cut-raised portion 400 common to each other.

Additionally, in the second embodiment, it is possible to stabilize the spring load to thereby reduce the spring constant, and to improve the blanking property to thereby reducing the manufacturing cost.

As has been described above, in the pad clip according to the present invention, a concave and convex fitting structure is formed in a braking support portion between a support member anchor portion and each friction pad so as to be U-shaped in the side view. In addition, in the pad clip, a plate spring portion for urging the friction pad in the radially outward direction of the rotor is provided in one of the opposite portions in the radial direction of the rotor, which are the portions following the U-shaped portion, and a cut portion is cut and raised at the base end portion of this plate spring portion in the direction opposite to the urging direction of the plate spring so as to be in contact with the support member.

The cut portion is made to contact with a corner of the concave and convex portion, and the spring fulcrum of the plate spring portion and the fulcrum of the cut-raised portion are made common to each other. Since the plate spring portion and the cut-raised portion are thus provided in a common portion, the blanking property is improved, and the load is prevented from scattering, so that it is possible to obtain such effects that the spring constant can be reduced, and the strength of the cut-raised portion can be improved.

Furthermore, lower guide projecting portions are formed at side edges of plate spring portions of a pad clip, respectively, so that projections can be rotated easily by making the lower guide projecting portions hook the projections when the friction pads are installed. Accordingly, the projections come into the clip smoothly so that the process of installation of the pads can be performed easily. In addition, upper guide projecting portions are provided also on the upper side portions so that the projections are guided by the upper and lower guide projecting portions. Accordingly, the work of installation of the pads can be performed more smoothly.

What is claimed is:

1. A pad clip for a disc brake, the disc brake comprising a friction pad disposed opposite to a rotor and a support member for bearing braking force from the friction pad, wherein one of a convexity and a concavity is formed at a side edge portion of the pad and the other is formed at a braking anchor portion of the support member, the convexity and the concavity engage with each other so as to form a concave and convex fitting portion, and the pad clip is disposed at the concave and convex fitting portion, which comprises:

an anchor portion disposed along an anchor surface formed at the concave and convex fitting portion;

an upper opposite portion connected to an upper end of the anchor portion;

a lower opposite portion connected to a lower end of the anchor portion; whereby the anchor portion, the upper opposite portion and the lower opposite portion form a U-shaped side view tracing the concave and convex fitting portion, the lower opposite portion is formed as a plate spring portion which urges the friction pad in the radial direction of the rotor;

wherein the plate spring portion comprises:

an arc portion which is formed while bent so as to contact with the lower area of the anchor surface but not so as to contact with a lower surface of the concavity;

an extended portion formed by extending the arc portion in the obliquely upward direction; and an upper contact portion formed in the top end of the extended portion so as to contact with a lower surface of the convexity.

2. The pad clip according to claim 1, further comprising a cut-raised portion being raised at a base end portion of the plate spring portion in the direction opposite to the radial direction and being brought into contact with a lower surface of the concavity.

3. The pad clip according claim 2, wherein an arc corner portion is formed between a support member anchor surface of the support member and the lower surface of the support member, and the cut-raised portion is bent to trace the arc corner portion and disposed along the arc corner portion.

4. The pad clip according to claim 2, wherein the start points of the plate spring portion and the cut-raised portion is common with the start point of the arc corner portion.

5. The pad clip according to claim 1, further comprising support fitting pawls formed at both side edges of the anchor portion.

6. A pad clip for a disc brake, the disc brake comprising a friction pad disposed opposite to a rotor and a support member for bearing braking force from the friction pad, wherein one of a convexity and a concavity is formed at a side edge portion of the pad and the other is formed at a braking anchor portion of the support member, the convexity and the concavity engage with each other so as to form a concave and convex fitting portion, and the pad clip is disposed at the concave and convex fitting portion, which comprises:

an anchor portion disposed along an anchor surface formed at the concave and convex fitting portion;

an upper opposite portion connected to an upper end of the anchor portion;

a lower opposite portion connected to a lower end of the anchor portion; whereby the anchor portion, the upper opposite portion and the lower opposite portion form a U-shaped side view tracing the concave and convex fitting portion, the lower opposite portion is formed as a plate spring portion which urges the friction pad in the radial direction of the rotor;

upper and lower guide projecting portions, respectively disposed at outside edges of the upper and lower opposite portions, the upper and lower guide projecting portions spread outward and upward;

wherein an upward extending angle of the upper guide projecting portion relative to the horizontal plane of the upper opposite portion is set to $\alpha$ and an upward extending angle of the lower guide projecting portion relative to the horizontal plane of the upper opposite portion is set to $\beta$, wherein the inequality $\alpha<\beta$ is satisfied, and the lower guide projecting portion projects outward more than the upper guide portion and the projecting distance in the horizontal direction is smaller than the thickness of the back plate of the friction pad.

7. A pad clip for a disc brake comprising:

a bridge portion;

a pair of coupling portions connected to both ends of the bridge portion;

a pair of U-shaped portions respectively connected to a lower end of the coupling portion;

wherein the pad clip is made of one metal sheet and one of upper and lower portions of the U-shaped portion is a plate spring portion;

upper and lower guide projecting portions respectively disposed at outside edges of the upper and lower portions of the U-shaped portion, the upper and lower guide projecting portions spread outward and upward;

wherein an upward extending angle of the upper guide projecting portion relative to the horizontal plane of the upper portion of the U-shaped portion is set to $\alpha$ and an upward extending angle of the lower guide projecting portion relative to the horizontal plane of the upper portion of the U-shaped portion is set to $\beta$, wherein the inequality $\alpha<\beta$ is satisfied, and the lower guide projecting portion projects outward more than the upper guide portion and the projecting distance in the horizontal direction is smaller than the thickness of a back plate of a friction pad.

8. The pad clip according to claim 7, further comprising a cut-raised portion raised downwardly at a base end portion of the plate spring portion the cut-raised portion being formed by cutting and raising a corner portion of the U-shaped portion.

9. The pad clip according claim 8, wherein the cut-raised portion has a curved shape.

10. The pad clip according to claim 8, wherein the cut-raised portion is cut and raised in such a manner that the start point of the plate spring portion coincides with the notch start point of the cut-raised portion.

11. The pad clip according to claim 7, wherein the plate spring portion comprises an arc portion of which start point defines the start point of the plate spring portion and an extended portion formed by extending the arc portion in the obliquely upward direction.

* * * * *